H. LEWIS, W. R. SCOTT & C. DELL.
HEAT REGULATING SYSTEM.
APPLICATION FILED JUNE 1, 1916.
1,265,927.
Patented May 14, 1918.
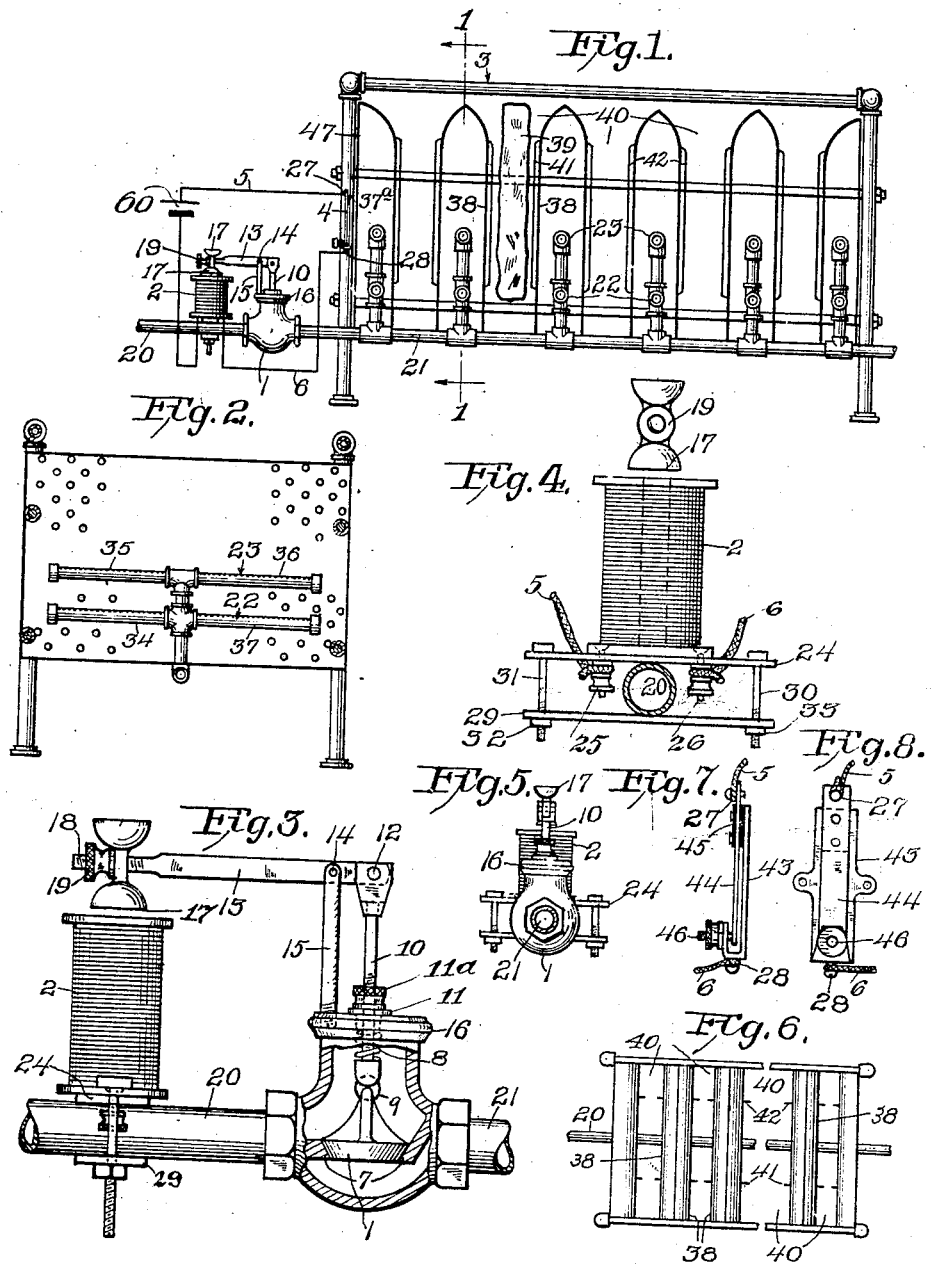
Harry Lewis,
William R. Scott,
Charles Dell.
INVENTORS.
BY *William A. Hirth*
ATTORNEY.

UNITED STATES PATENT OFFICE.

HARRY LEWIS, WILLIAM R. SCOTT, AND CHARLES DELL, OF PITTSBURGH, PENNSYLVANIA, ASSIGNORS TO PITTSBURGH AUTOMATIC HEAT REGULATOR COMPANY, OF PITTSBURGH, PENNSYLVANIA, A CORPORATION OF DELAWARE.

HEAT-REGULATING SYSTEM.

1,265,927.  Specification of Letters Patent.  Patented May 14, 1918.

Application filed June 1, 1916. Serial No. 101,098.

*To all whom it may concern:*

Be it known that we, HARRY LEWIS, WILLIAM R. SCOTT, and CHARLES DELL, citizens of the United States of America, residing at Pittsburgh, in the county of Allegheny and State of Pennsylvania, have invented certain new and useful Improvements in Heat-Regulating Systems, of which the following is a specification.

The present invention relates to improvements in heat regulating systems, and provides a system in which is used a thermostat, a valve with an electro-magnet, and accompanying electric circuit, and thereby a method of regulating the supply of fuel is provided for any particular purpose, such as for instance the supply of gas for a device for toasting bread, which is used in the accompanying drawings to illustrate one use of the system.

The same system of heat regulation can be applied to various other purposes such as the automatic regulation of the temperature of the interior of a building.

In the case of its use or application to a device for toasting bread, the system is arranged so that after the gas has been supplied to the burners forming part of the device for any given interval of time, the thermostat will open the electric circuit controlling the valve and shut off partially or wholly the supply of gas to said burners. By a slight manual operation the system can be again started, and will automatically cease its function of supplying gas to the burners when the predetermined time interval is reached, as will be more fully explained hereinafter in this specification.

In the accompanying drawings I have illustrated one complete example of the physical embodiment of my invention, constructed according to the best mode I have so far devised for the practical application of the principles of the invention.

Figure 1 is a longitudinal vertical section through a device for toasting bread, with my heat regulating system attached thereto.

Fig. 2 is a vertical cross section on line 1—1 of Fig. 1.

Fig. 3 is a side view of the valve and electro-magnet used in my system of regulation, the valve being shown partly in section.

Fig. 4 is an end view taken from the left of the electro-magnet shown in Fig. 3.

Fig. 5 is an end view of the electromagnet taken from the right of Fig. 3.

Fig. 6 is a plan view of the toaster shown in Fig. 1.

Fig. 7 is a side view of the thermostat used.

Fig. 8 is a front view of same.

In the drawings 1 is a valve, 2 is an electro-magnet, 3 is a device for toasting bread, 4 is a thermostat, 5, 6 are the wires leading from the thermostat to the terminals of the electro-magnet, and with said thermostat and electro-magnet form an electric circuit when properly energized.

Referring to the particular construction of the valve 7 is the valve seat, 9 is a universal joint in the valve stem 10 designed to enable the valve 1 to readily find a perfect seat in 7. The valve stem 10 has a stuffing box 11, and an adjusting annular screw-threaded ring 11$^a$ adapted to engage threads on the stem, and control the adjustment of the opening between the valve 1 and the valve seat 7. A spring 8 surrounding the stem 10, and acting under and against the inside of the valve cap 16, tends to keep the valve 1 on its seat 7, or as near to such position as the adjustment set by 11$^a$ will allow same. At the top the stem 10 is provided with a pin 12, to which is pivotally connected a lever arm 13. The lever arm 13 is fulcrumed at 14 in a vertical support 15, the latter being screw-threaded into the top of valve cap 16, and the height of point 14 can be adjusted by advancing or withdrawing said support 15 in the threads in cap 16.

On the end of the lever arm 13 is an armature 17 which is adjusted by means of a thread 18 and thumb-screw 19. 20 is a gas supply line, and 21 is same leading from the valve 1 to the burners 22, 23 of the toasting device. The electro-magnet 2 is supported on a cross-bar 24, and beneath same are two terminals 25 and 26 leading from the magnet, and to which are attached the wires which lead to the thermostat. The wires 5 and 6 are attached at 27 and 28 to points on the thermostat 4 as shown. A cross-bar 29 passes beneath the gas supply line 20, and two bolts 30, 31, with nuts 32, 33 hold the two cross-bars securely to the gas pipe 20. The gas pipe 21 has four branches 34, 35, 36, 37 in each chamber of the toasting device 37ª, with perforations on their top surfaces which form exits for the gas, and at which points the gas burns to heat up the perforated metal walls 38 of the toaster 3. The heat from 38 serves to toast the bread 39 lodged in the cells 40. 41, 42 are wires which serve to keep the bread from immediate contact with the heated walls 38 and prevent charring of the bread.

The thermostat 4 comprises a frame 43 and a part 44 composed of two flat strips of different metals secured flat-wise together and affected in different degrees by temperature, and supported at 45 on the frame 43, but insulated therefrom. On the upper end of 44 provision is made for connecting one of the wires 5 to a terminal 27, and the other wire 6 is connected to a terminal 28 on the base portion of frame 43. The latter carries an adjustable screw-threaded pin 46, which in its normal position is in immediate contact with 44. The thermostat is attached to the face of one of the metal end walls 47 of the toasting device as shown in the drawings.

The operation of the heat regulating system is as follows. The time necessary to toast the bread is found by trial to be about two minutes, and by setting adjusting screw 46 of the thermostat to the desired length, also found by experiment with the device, the part 44 when heated to a certain point will retract its lower extremity from the contact point 46 as originally set, by the metal in 44 curling inwardly toward the frame 43 of the thermostat.

By adjusting the annular ring 11ª the valve can be made to remain off its seat 7 a short distance as before described, thus allowing a small quantity of gas to reach the burners 22, 23, and act as pilot jets at 34, 35. For purpose of illustration we will assume the gas is flowing in small quantity from the source of supply, through the valve to the burners, which have been ignited. As long as the electric circuit is kept open at 17, it is evident no more gas than will supply the pilot jets can pass the valve to the burners. If the armature 17 is pressed down manually on the pole of the electro-magnet for a few seconds, a full supply of gas will flow through the valve 1, and the walls 38 of the toasting device will become heated, and the thermostat being attached to the end wall 47 of same will also become heated.

A difference of potential is in this way at once established in the thermostat 4, and an electric current will be generated in the circuit wires 5, 6, contact between 44 and 46 being their normal condition before they become heated. The hand can now be removed from 18 and the electro-magnet being energized by the current will attract 17 securely to it, thus holding the valve 1 wide open from its seat 7. A single cell battery 60 may be included in circuit 5 containing thermostat 4 and magnet 2, as an additional electromotive force. The walls 38 of the toasting device will under these conditions continue to increase in temperature to a red heat, thereby toasting the bread. After a period of two minutes, or proper time interval as before explained the metal 44 becomes affected by the heat from the wall 47 to such a degree that it will leave the screw 46, thereby breaking the electric circuit, in which case the magnet releases 17 and the amount of gas flowing is reduced to the pilot jet quantity, as the spring 8 contained in the valve will compel the valve 1 to return to its seat 7, except for the amount the valve is permanently held open by the adjusting annular ring 11ª.

All that is necessary is to manually close the circuit at 17 again and the operation is repeated as often as necessary.

When it is desired to shut off the pilot jet flow entirely, it is done by closing the cock on the supply line leading to pipe 21. This cock is not shown on the drawings.

In adapting the system to the control of the temperature in a room, the armature is placed in intimate relation to the pole of the electro-magnet, by adjusting the height of the fulcrum 14 so that the electric circuit will become energized as soon as the thermostat metal 44 becomes electrically affected by the surrounding temperature. By adjusting the contact screw 46 the thermostat can be made to open the circuit at any desired temperature, the amount of adjustment necessary being determined by trial for various temperatures. In this way the valve can be closed or partially closed at any particular temperature, and the latter regulated. As soon as the temperature falls below the point at which the thermostat is set to open, the connection at 53 will again be established by the cooling metal 44, the circuit again becomes energized, more fuel is supplied to the heating device used, the temperature of the room rises to the predetermined point, and the thermostat action will take place once more to open the circuit and partially close the valve. Hence it is seen that the operation is practically continuous, and the temperature of the room can be automatically held at or near any predetermined point of the thermometer desired.

What we claim is:

In a heat regulating system, a valve and valve stem therefor with a horizontally disposed lever carrying on its free extremity an armature, said armature being adjustable longitudinally of the lever, an electro-magnet having a pole or poles, and accompanying terminals, a fuel supply pipe below and parallel with said lever, said magnet being supported on cross-bars located above and below the fuel supply pipe, means for adjustably holding the cross-bars to said pipe, said fuel supply and delivery line connected to the aforesaid valve body, an electric circuit, means for utilizing the heat generated by the fuel for electrically affecting a thermostat, a thermostat to energize the electric circuit, and deënergize same at a predetermined time interval or temperature, and thereby control the flow of fuel through the aforesaid valve, and regulate the amount of heat produced by the fuel passing through same.

In testimony whereof we affix our signatures in presence of two witnesses.

HARRY LEWIS.
WILLIAM R. SCOTT.
CHARLES DELL.

Witnesses:
JOHN F. SWEENY,
MARGARET H. LEFEBORER.

Copies of this patent may be obtained for five cents each, by addressing the "Commissioner of Patents, Washington, D. C."